United States Patent [19]

Mosely et al.

[11] 4,262,641
[45] Apr. 21, 1981

[54] COMBINED RPM LIMITER, AND ELECTRONIC TACHOMETER WITH SHIFT POINT INDICATOR

[75] Inventors: Gordon P. Mosely; Michael D. Dillahunty, both of Carson City, Nev.

[73] Assignee: W. R. Grace & Co., New York, N.Y.

[21] Appl. No.: 963,649

[22] Filed: Nov. 24, 1978

[51] Int. Cl.³ .......................... F02D 31/00; G01P 3/58
[52] U.S. Cl. ..................................... 123/335; 324/166; 324/168; 324/169
[58] Field of Search ................ 123/118, 102, 198 DC; 224/15, 166, 168, 169

[56] References Cited

U.S. PATENT DOCUMENTS

| 2,934,703 | 4/1960 | Cohen | 324/169 |
| 3,581,720 | 6/1971 | Hemphill et al. | 123/118 |
| 3,673,992 | 7/1972 | Westberg | 123/118 |
| 3,737,773 | 6/1973 | Zobel | 324/166 |
| 3,738,340 | 6/1973 | Olson | 123/118 |
| 3,789,810 | 2/1974 | Sattler | 123/102 |
| 3,828,742 | 8/1974 | Weis | 123/102 |
| 3,967,604 | 7/1976 | Kondo | 123/118 |

OTHER PUBLICATIONS

IC Op-Amp Cookbook, by Walter G. Jung, Copyright 1974, Howard W. Sams and Co., pp. 172-183.
"IC Engine Tachometer and 'Red Line' Indicator," by Robert A. Hirschfield, Electronics World, May 1967, pp. 37-39.

Primary Examiner—Tony M. Argenbright
Attorney, Agent, or Firm—William Kovensky

[57] ABSTRACT

A multi-function device using two ICs, with the precision ignition pulse frequency-to-voltage converted signal produced in the RPM portion being used as input to both ICs. Chatter pulses produced by an operational amplifier in the RPM limiter are utilized to shunt ignition pulses to ground in a proportional manner as engine speed approaches the selected maximum.

32 Claims, 1 Drawing Figure

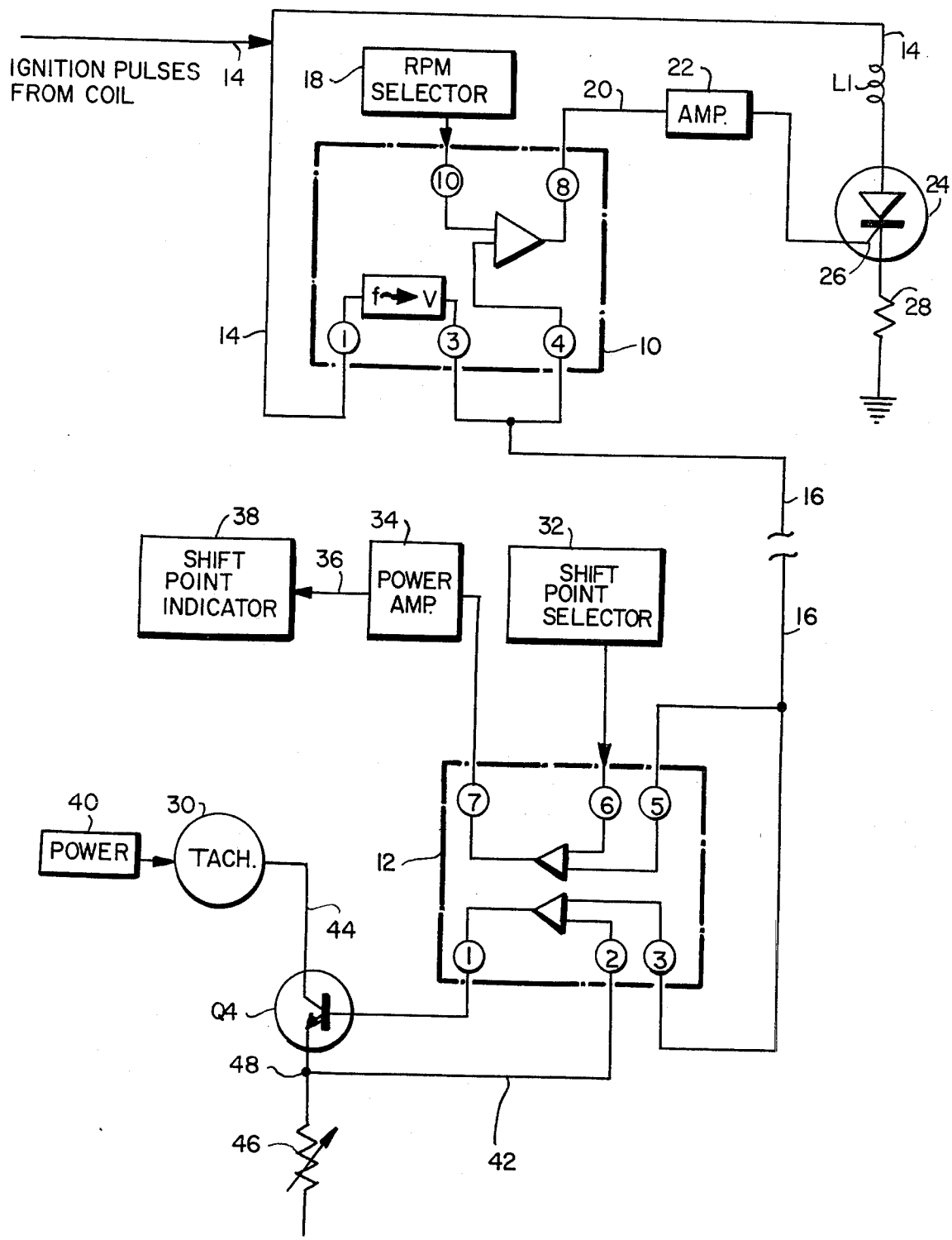

COMBINED RPM LIMITER, AND ELECTRONIC TACHOMETER WITH SHIFT POINT INDICATOR

This invention relates to electronic means for controlling the RPM of engines of various sorts, and to an electronic tachometer particularly useful in racing automobiles and the like. The tachometer portion also includes a light or other means to indicate a preselected RPM, such as is useful for indicating a point at which the transmission associated with the engine should be shifted.

The two portions are useful together or separately. For example, the RPM limiter is useful alone in marine applications wherein it is important to hold the RPM of the engine below a predetermined level to prevent it from "running" away. For example, in high power racing and pleasure boats it is common for the propeller to temporarily leave the water in choppy seas. When the propeller is out of water it is possible for the engine to damage or even destroy itself because of the reduced resistance to rotation of the propeller. The present invention holds engine RPM to less than some predetermined value to prevent such damage.

The RPM limiter could also be used as a governor in stationary engines of various different sorts, such as on oil drilling rigs, motor-generator sets, and the like.

The RPM limiter portion of the invention is built around a single electronic integrated circuit (IC), thus greatly simplifying its construction with respect to prior art structures which involve many more parts. In addition, the single IC has the advantage of being highly reliable, relatively inexpensive, lends itself to manufacture into a relatively small module, and the like.

The RPM limiting function utilizes proportional shunting of the ignition pulses to achieve its modus operandi. Proportional shunting is per se old, and involves shunting of increasing numbers of ignition pulses as the engine speed approaches the preset maximum. When and if engine speed should reach this maximum, all ignition pulses will be shunted to ground, thus causing the engine to stop. The improvement of the invention involves the manner in which this is done and the utilization of certain inherentcies in a unique manner to accomplish this end.

The tachometer and shift indicator portion of the invention is also built about a single IC, and thus benefits from all of the advantages as set forth above from this simplified construction.

Further, it lends itself to being built into a single module together with the RPM limiter in that that portion, the RPM limiter, produces a voltage signal which is precisely proportional to both engine speed and the frequency of the ignition pulses, and utilizes this signal to drive the tachometer instrument. However, the tachometer portion of the invention could derive this signal from sources other than the invention RPM limiter, and therefore it is useable with or without the RPM limiter. The two ICs and their separate functions, RPM limiting and tachometer, however, very easily fit together into a single module because of this commonalty of use of the voltage signal produced in the RPM IC. However, the shift light and tachometer portion can be used independently of the RPM limiting portion by providing other means to produce an analog signal precisely proportional to engine speed. This is more or less routine, many sorts of transducers could be used, for example, an optical device coupled to the crank shaft or fly wheel, and magnetic pickups of various sorts. Ignition type electronic transducers are a broad class wherein such devices can be found, and many such could be used, as is well known to those skilled in these arts.

Proportional shunting is highly desireable as opposed to the older approach which involves a sharp cut-off or instant shunting of the ignition directly to ground. When the ignition is grounded suddenly, many cylinder charges of raw gasoline/air mixture must be vented through the exhaust system all at once when engine speed reaches the preset maximum, which is highly undesirable. With proportional shunting, only a few unburned charges must be exhausted, thus greatly diminishing this harmful effect. Further, the proportional shunting has a self correcting aspect, as it occurs it causes the engine to slow down, thus pushing engine speed below its proximity to the preset speed at which it will shut off, i.e., forcing the engine back into a normal safe operating range.

The sole FIG. 1 is an electronic schematic diagram of a circuit embodying the invention.

Referring now in detail to the drawing, reference numeral 10 indicates an integrated circuit (IC) chip about which the RPM limiting function is built, and another chip or IC 12 indicates the tachometer and shift light portion. In the successfully constructed embodiment, IC 10 is made by National Semiconductor, their part number LM2917N. The tachometer IC is a National Semiconductor part number LM358. In both cases the circled numbers indicate the pin numbers on the particular IC which are used in the invention. Each of these IC's 10 and 12 has many more pins than those shown for various different functions, specifically, 14 pins in the case of chip 10 and 8 pins in the case of chip 12. The normal hookup and usage of these chips is well known to those skilled in the art, such other pins being connected to power supplies, means to establish a reference voltage, and the like.

Line 14, as indicated, delivers ignition pulses from the engine being controlled to pin number 1 of IC 10, as well as to a silicone controlled rectifier (SCR) 24. The SCR 24 controls the actual shunting to ground of the ignition pulses in a manner to be explained below. Line 14 is preferably connected to the minus side of the coil in conventional internal combustion engines.

An important characteristic of IC 10 and its use in the invention is that it will transform the frequency of the signal delivered to pin 1 which is, of course, proportional to the speed of the ignition and hence the speed of the engine, into a highly accurate precision voltage at pin 3 present on line 16. This voltage is thus very precisely proportional to engine RPM sensed on line 14. This frequency to voltage transformation occurs in accordance with a formula or algorithim built into IC 10.

Means 18 are provided at provided at pin 10 to input a signal, as a voltage, proportional to the preselected RPM at which it is desired that the engine be shutdown. Such means are well known to those skilled in these arts, and could, for example, comprise a potentiometer with suitable protective and supporting electronic components including its own power supply, to produce such a voltage or signal proportional to a selectable shutoff RPM. Alternatively, as might be the case with stationary engines, a fixed voltage signal could be provided at pin 10 proportional to the desired shutdown speed.

As an example of additional elements used with the IC 10, there will be provided on line 16 at pin 3, a trimming potentiometer which will control the signal delivered from pin 3 to pin 4 to match the characteristics of the particular RPM selector 18. Such means are not shown for the sake of simplification.

Pins 4, 8, and 10 comprise an operational amplifier which is used to drive the shunting SCR 24 in a proportional manner. The means 18 include means to provide a positive signal at the pin 10 proportional to the selected RPM at which the engine is to shut down. The precision voltage on line 16 is also an input to the operational amplifier by being jumped across to pin 4. Pin 8 delivers the output of a direct arithmetic comparison of these two signals. As is known the system, externally, works with plus signals only. However, the operational amplifier is a comparator and internally reverses the sign of the signal on pin 10, thus making it negative or ground. Thus, so long as the positive signal proportional to actual engine speed is smaller as an absolute value than the selected voltage signal as an absolute value on pin 10, then the output on pin 8 will be "negative", but, in fact, grounded.

The operational amplifier on the pins 4, 8, and 10 has an off or negative state which is ground. Thus, production of positive pulses on the line 20 is accomplished automatically, in that so long as actual engine speed is less than the selected speed, the output at pin 8 will be negative, and thus internally grounded, thus causing no signal to be present on line 20. It is only as engine speed approaches the selected speed and chatter begins to occur that positive pulses will begin to appear on line 20.

Thus, line 20 will deliver to amplifier 22 only positive signals, which will occur only as engine speed approaches the preselected maximum.

Solid state logic operational amplifiers such as is located on the pins 4, 10, and 8 of the IC 10 have an inherent charateristic that is normally a disadvantage, i.e., they "chatter" as they approach a zero condition. "Chatter" as used in the specification and claims herein means an intermittent or "fluttering" type of on/off operation that occurs in a proportional manner as the two inputs get closer to each other in value. In the present case, such a zero condition would occur as engine speed increases and comes up to the preselected maximum represented by the signal generated by the means 18. In most situations where operational amplifiers are used, such as on the pins 1, 2, and 3 of the IC 12 of the tachometer portion of the invention below, this is corrected by a feedback or hystersis loop, which has the effect of causing the change over at the output of the operational amplifier to be crisp. The chattering effect is not corrected on the pins 4, 10, and 8 of the IC 10, and is utilized to advantage in the present invention to inherently cause proportional grounding out of the ignition pulses. It is the use of this otherwise disadvantageous feature of operational amplifiers which permits the invention to accomplish its goals using significantly fewer components than heretofore.

As an example of how the invention operates, in testing, an engine was controlled and the RPM at which it was to shut off was selected at 8000 RPM on means 18. As engine speed passed 7800 RPM and was in the range of 7800 to 7900 RPM, the chattering began to appear on pin 8, and the proportional shutting down of the engine began to happen. Another advantage of the use of chatter is that the proportional shutting down occurs in a linear manner, which is also utilized to advantage.

Many of the prior art electronic RPM limiters operate in a logarithmic manner at the equivalent of line 20. On initial examination without in-depth thought, the logarithmic response might be thought to be preferred over a linear response. In fact, the logarithmic response presents a severe disadvantage in that it requires each separate instrument of a production run of such devices to be individually and separately calibrated before it can be sold. The present invention with its linear response can be sold without individual piece-by-piece calibration, solely because of the linear response. Thus, the invention achieves still another important economic advantage while maintaining the full advantages and modus operandi of prior art devices.

Amplifier 22 is conventional, the production unit is built around a pair of transistors arranged in a cascade fashion in the usual manner. The shunting pulses in a "chattering" manner, are delivered by line 20 to the gate terminal 26 of the SCR 24.

As is known, an SCR is analogous to a switch having a memory. The memory aspect means that the switch will stay in a changed state unless it is caused, by some additional event or action, to change back to its original state. The changed state is caused by a positive pulse on the line 20 delivered to the gate 26 of the SCR 24. The reversion back to the original state can be accomplished in several different ways, one of which is the imposition of a reversed pulse, that is, reversed with respect to the normal current flow through the device. Of course, SCRs are normally open devices, that is, not shunting the ignition pulses on line 14 to ground. It is only when pulses are delivered to the gate 26 does it then begin to shunt ignition pulses to ground slowing and then if necessary stopping the engine.

Thus, the operational amplifier contained on the pins 4, 8, and 10 of IC 10 act as a kind of analog to digital converter. That is the two analog signals, the precision voltage on line 16 and the voltage corresponding to selected cut off speed from means 18, are converted to a series of positive going pulses at amplifier 22, their frequency being proportional to the chatter characteristic of the operational amplifier. These pulses are individual and discrete when delivered to gate 26 of SCR 24.

The invention utilizes another natural charateristic of the environment in which it operates, namely, the nature of the pulse from the coil present on line 14. Such ignition pulses have a deteriorating sinusoidal tail end, which sine wave has of course, positive as well as negative going segments. The positive going pulse segment is utilized to reset the SCR 24 after each positive going pulse from pin 8 on line 20. Thus, if engine speed should approach close to the preset value, sufficiently close to begin to produce chatter digital signals on line 20, the first one of such chatter pulses will operate the gate 26, to thereby ground the next ignition pulse on line 14. The tail end positive going segment of that same ignition pulse which has been grounded will act to reset SCR 24. If engine speed should then fall, operation will continue normally. If engine speed should continue to increase despite the grounding of this first ignition pulse, then chatter pulses will continue to be produced on line 20 and at an increasing speed. Thus more and more ignition pulses will be grounded, with each one as it is grounded resetting the SCR. As speed gets very close to the preset value, if the engine has not already been shut off by that time, then the chatter pulses will come at a rate of speed faster than the ignition pulses, and there will be at least one chatter pulse after the tail end of each ignition pulse and prior to the presence of the next ignition pulse, thus, in effect, completely grounding the ignition of the engine. This, of course, will occur immediately before or right at the selected speed.

The resistor 28 between the SCR 24 and ground is protective, it limits current flow through the SCR.

The inductor L1 controls the rate of increase of current flow with respect to time through the SCR which is, of course, its critical operational characteristic with respect to both the frequency of ignition pulses and the frequency of the chatter pulses on line 20. Thus, the presence and inclusion of the inductor L1 together with the SCR 24 provides other important advantages for the invention, namely, it permits the use of a much less expensive element as the SCR 24 than would otherwise be provided. That is, absent the inductor L1 to control its operational response characteristics, and absent the resistor 28 to protect it, a more precision, expensive, and heavier rated SCR 24 would be necessary.

Referring now to the lower half of the figure, the signal on line 16 proportional to speed is delivered to the pins 3 and 5 of the IC 12. For purposes of the invention, IC 12 includes two separate operational amplifiers, one on the pins 5, 6, and 7, and the other on the pins 1, 2, and 3.

The operational amplifiers in the two IC's 10 and 12 operate between a low and a high state. The low state is made to correspond to ground, whereby the modus operandi of the invention is enhanced in that signals corresponding to actual engine speed below the selected speed in the case of the shift point selector 32 and the RPM selector 18, are both automatically internally grounded, no signals being present on the output lines 20 and 36 respectively until the invention circuit comes into effect as set forth above.

As mentioned above, the tachometer portion to be described below, and the RPM limiter described above, can have separate utility. In such case it would be necessary to provide on line 16 in the lower half a signal in analog form proportional to the speed of the engine or other speed to be read out on the tachometer 30.

The operational amplifier between the pins 5, 6, and 7 in IC 12 is highly analogous to the operational amplifier in IC 10 located between corresponding pins 4, 10, and 8. Therefore, a shift point selector mechanism 32, highly analogous to RPM selector means 18, delivers a voltage signal to pin 6. The signal proportional to actual engine speed is delivered to the other input of this operational amplifier via pin 5. The output is present on line 36 delivered through a power amplifier 34 to a shift light indicator 38. The amplifier 34 preferably has a self-contained power supply to thereby reduce the load on the IC 12. The manner of operation of this half of the IC 12 as to the indicator 38, is that it remains unlit or unactivated so long as actual speed as a positive going pulse is less than the preselected shift point speed. As actual speed approaches and actually surpasses the speed at which the shift point light is to become illuminated, the light will operate in a steady state condition. Of course, as is known, auditory means as well as a relative large light could also be used as the indicator means 38. Means are provided so that chatter will not cause light 38 to flicker. Such means are conventional and may comprise, for example, a feedback loop.

The invention utilizes a tachometer 30 which is amperage responsive, rather than voltage responsive. This is desirable because the meter can then be made much more durable and heavy duty, including heavier springs, thus making the tachometer much less responsive to road shocks and the like as are experienced in racing cars. The needle of an amperage responsive tachometer stays much more steady during use than occurs in other types of tachometers.

The operational amplifier on the pins 1, 2 and 3 of IC 12, together with the power transistor Q4, operate together to drive tachometer 30. A power supply 40 for the tachometer also serves to clamp it to a particular voltage, so that the meter 30 will respond more accurately and solely to amperage changes delivered from the operational amplifier and the transistor Q4. Thus, these two portions of the circuit operate together as a precision voltage to amperage converter to drive the tachometer 30. The potentiometer 46 is provided for purposes of calibrating the indicating part of the circuit including the tachometer 30 and is suitably grounded in the usual fashion.

It is a characteristic of operational amplifiers including the one on pins 1, 2 and 3 that the amplifier constantly attempts to bring the controllable input to match the constant input. In this case, the variable and not controllable input (as to this operational amplifier) is the precision voltage on line 16 delivered to pin 3. At pin 2, there is a feedback loop on line 42 from the emitter of transistor Q4. The collector of Q4 is connected by line 44 to drive the tachometer meter 30. A potentiometer 46 is located in line 44 below the junction point 48 of the lines 42 and 44. Thus, the control input on pin 2 is in fact the feedback. In this manner the operational amplifier on pins 1, 2, and 3 together with the power transistor Q4 together produce more or less power in the form of amperage on line 44 as it is needed to bring the two inputs on the pins 2 and 3 to equality. Of course, the amperage signal on line 44 drives the tachometer. Thus, an extremely high quality conversion of the voltage on the line 16 to a amperage signal on line 44 is accomplished in an instantaneous electronics mode. Further, in addition to the conversion, an amplification of the precision voltage into an amplified amperage signal is provided to achieve the advantages of allowing use of a amperage responsive meter rather than a voltage responsive meter as tachometer 30.

Stated another way, with the junction point 48 clamped at pin 2 to closely follow and match the precision voltage signal on line 16 delivered to pin 3, the amplifier at pins 1, 2, and 3 together with the power transistor Q4 closely follows and amplifies this signal to produce an amplified precision voltage to amperage conversion on the line 44.

A single operational amplifier on the pins 5, 6, and 7 has been shown wherein only one shift point light or indicator 38 is driven. If two or more such indicators should be desired, as in a five speed transmission racing car, larger ICs could be used. Additional operational amplifiers and additional selectors analogous to 32 could be used, with these outputs from these additional amplifiers used to drive the same or an additional shift point indicator light. In such case, other means to cause the light to go out after each shift and to relight when the next shift point is reached would have to be provided.

Frequently, as is ordinary in the art, the shift point indicator in the form of a light will be built into the face of the tachometer 30 thus improving the racing driver's view of both speed indication and shift point indication.

While the invention has been described in detail above, it is to be understood that this detailed description is by way of example only, and the protection granted is to be limited only within the spirit of the invention and the scope of the following claims.

We claim:

1. A method of controlling the RPM of an engine using proportional shunting to ground of ignition pulses, comprising the steps of converting the stream of ignition pulses to a first analog signal whose value is in a predetermined relationship to the frequency of said stream of ignition pulses and to the RPM of said engine continuously and directly supplying said first signal as one of the inputs to an operational amplifier, generating a second analog signal whose value is related to a manually variably selected maximum engine RPM in accordance with said predetermined relationship used to generate said first signal, continuously and directly supplying said second signal as the second input to said operational amplifier, and supplying chatter and positive value outputs from said operational amplifier to means to proportionally ground said ignition pulses.

2. The method of claim 1, wherein said first and second analog signals are voltages.

3. The method of claim 1, said means to ground said ignition pulses comprising an SCR.

4. The method of claim 3, and an inductor in series circuit with said SCR, whereby said SCR response time is such that chatter signals from said operational amplifier will control engine RPM in a proportional manner as RPM approaches said selected RPM and will act to shunt all ignition pulses to ground when engine RPM reaches said selected RPM.

5. A method of operating a tachometer and a shift point indicator using a pair of operational amplifiers, comprising the steps of continuously supplying a first analog signal whose value has a predetermined relationship to actual engine RPM as one of the inputs to each of said operational amplifiers, generating a second analog signal whose value is related to a selected shift point RPM in accordance with said predetermined relationship used to generate said first signal, continuously supplying said second signal as the second input to a first of said operational amplifiers, supplying positive value outputs from said first operational amplifier to said shift point indicator, supplying the output signal of said second operational amplifier to the base of a transistor, feeding back a signal from said transistor as the second input to said second operational amplifier, and using a signal from said transistor to drive said tachometer.

6. The method of claim 5, wherein all of said analog signals are voltages, said second operational amplifier together with said transistor performs a voltage to current conversion, and driving said tachometer with said amplified current signal from said transistor and second operational amplifier.

7. The method of claim 6, wherein said amplified current signal is taken from the collector of said transistor and the emitter signal from said transistor is fed back.

8. The method of claim 5, wherein both of said operational amplifiers are part of a single IC.

9. An engine RPM controller using proportional shunting to ground of ignition pulses, comprising means for converting the stream of ignition pulses to a first analog signal whose value has a predetermined relationship to the frequency of said stream of ignition pulses and to the RPM of said engine, means for continuously and directly supplying said first signal as one of the inputs to said operational amplifier, means for generating a second analog signal whose value is related to a normally valuably selected maximum engine RPM in accordance with said predetermined relationship used to generate said first signal, means for continuously and directly supplying said second signal as the second input to said operational amplifier, means for grounding said ignition pulses, and means for proportionally supplying chatter and positive value outputs from said operational amplifier to said means to ground said ignition pulses.

10. The combination of claim 9, wherein said first and second analog signals are voltages.

11. The combination of claim 9, said means to ground said ignition pulses comprising a SCR.

12. The combination of claim 11, and an inductor in circuit with said SCR, whereby said SCR response time is such that chatter signals from said operational amplifier will act to slow engine RPM by grounding increasing numbers of said ignition pulses as RPM approaches said selected RPM and will act to shunt all ignition pulses to ground when engine RPM reaches said selected RPM.

13. A tachometer and a shift point indicator using a pair of operational amplifiers comprising means for continuously supplying a first analog signal whose value has a predetermined relationship to actual engine RPM as one of the inputs to each of said operational amplifiers, means for generating a second analog signal whose value is related to a selected shift point RPM in accordance with said predetermined relationship used to generate said first signal, means for continuously supplying said second signal as the second input to a first of said operational amplifiers, means for supplying positive value outputs from said first operational amplifier to said shift point indicator, means for supplying the output signal of said second operational amplifier to the base of a transistor, means for feeding back a signal from said transistor as the second input to said second operational amplifier, and means for using a signal from said transistor to drive said tachometer.

14. The combination of claim 13, wherein all of said analog signals are voltages, said second operational amplifier together with said transistor performs a voltage to current conversion, and driving said tachometer with said amplified current signal from said transistor.

15. The combination of claim 14, wherein said amplified current signal is taken from the collector of said transistor and the emitter signal from said transistor is fed back.

16. The combination of claim 13, wherein both of said operational amplifiers are part of a single IC.

17. A method of controlling the RPM of an engine using proportional shunting to ground of ignition pulses, and of operating a tachometer; comprising the steps of converting the stream of ignition pulses to a first analog signal whose value is in a predetermined relationship to the frequency of said stream of ignition pulses and to the actual RPM of said engine, continuously supplying said first signal as one of the inputs to a first operational amplifier, generating a second analog signal whose value is related to a first selected RPM which the speed of said engine is not to exceed in accordance with said predetermined relationship used to generate said first signal, continuously supplying said second signal as the second input to said operational amplifier, supplying chatter and positive value outputs from said operational amplifier to means to proportionally ground said ignition pulses, supplying said first analog signal as one of the inputs to a second operational amplifier, supplying the output signal of said second operational amplifier to the base of a transistor, feeding back a signal from said transistor as the second input to said second operational amplifier, and using a signal from said transistor to operate said tachometer.

18. The method of claim 17, and a shift point indicator, supplying said first analog signal as one of the inputs to a third operational amplifier, generating a third analog signal whose value is related to a selected shift point RPM in accordance with said predetermined relationship used to generate said first signal, supplying said third signal as the second input to said third operational amplifier, and supplying positive value outputs from said third operational amplifier to said shift point indicator.

19. The method of claim 17, said means to ground said ignition pulses comprising an SCR.

20. The method of claim 19, and an inductor in series circuit with said SCR, whereby said SCR response time is such that chatter signals from said first operational amplifier will act to control engine RPM in a proportional manner as RPM approaches said first selected RPM and will act to shunt all ignition pulses to ground when engine RPM reaches said first selected RPM.

21. The method of claim 17, wherein all of said analog signals are voltages, said second operational amplifier together with said transistor performs a voltage to current conversion, and driving said tachometer with said amplified current signal from said transistor and said third operational amplifier.

22. The method of claim 21, wherein said amplified current signal is taken from the collector of said transistor and the emitter signal from said transistor is fed back.

23. The method of claim 18, wherein said second and third operational amplifiers are part of a single IC.

24. A combined engine RPM controller using proportional shunting to ground of ignition pulses, and a tachometer, comprising means for converting the stream of ignition pulses to a first analog signal whose value has a predetermined relationship to the frequency of said stream of ignition pulses and to the RPM of said engine, means for continuously supplying said first signal as one of the inputs to a first operational amplifier, means for generating a second analog signal whose value is related to a selected maximum engine RPM in accordance with said predetermined relationship used to generate said first signal, means for continuously supplying said second signal as the second input to said first operational amplifier, means for proportionally grounding said ignition pulses, means for supplying chatter and positive value outputs from said operational amplifier to said means to ground said ignition pulses, a second operational amplifier, means for supplying said first analog signal as one of the inputs to said second operational amplifier, means for supplying the output signal of said second operational amplifier to the base of a transistor, means for feeding back a signal from said transistor as the second input to said second operational amplifier, and means for using a signal from said transistor to drive said tachometer.

25. The combination of claim 24, a shift point indicator and a third operational amplifier for operating said shift point indicator in conjunction with said tachometer, means to supply said first analog signal as one of the inputs to said third operational amplifier, means for generating a third analog signal whose value is related to a selected shift point RPM in accordance with said predetermined relationship used to generate said first signal, means for supplying said third signal as the second input to said third operational amplifier, and means for supplying positive value outputs from said third operational amplifier to said shift point indicator.

26. The combination of claim 25, wherein all of said signals are voltages.

27. The combination of claim 24, said means to ground said ignition pulses comprising a SCR.

28. The combination of claim 27, and an inductor in circuit with said SCR, whereby said SCR response time is such that chatter signals from said first operational amplifier will act to slow engine RPM by grounding increasing numbers of said ignition pulses as RPM approaches said selected RPM and will act to shunt all ignition pulses to ground when engine RPM reaches said selected RPM.

29. The combination of claim 25, wherein said combined controller, tachometer, and shift point indicator comprise two ICs contained in a single electronic module.

30. The continuation of claim 24, said second operational amplifier together with said transistor performs a voltage to current conversion, and driving said tachometer with said amplified current signal from said transistor.

31. The combination of claim 30, wherein said amplified current signal is taken from the collector of said transistor and the emitter signal from said transistor is fed back.

32. The combination of claim 25, wherein said second and third operational amplifiers are part of a single IC.

* * * * *